United States Patent
Emelie et al.

(10) Patent No.: US 11,398,196 B2
(45) Date of Patent: Jul. 26, 2022

(54) METHODS FOR DRIVING ELECTRO-OPTIC DISPLAYS

(71) Applicant: E INK CORPORATION, Billerica, MA (US)

(72) Inventors: Pierre-Yves Emelie, Mountain View, CA (US); Ana L. Lattes, Newton, MA (US); Kenneth R. Crounse, Somerville, MA (US); Chih-Hsiang Ho, Andover, MA (US)

(73) Assignee: E Ink Corporation, Billerica, MA (US)

(*) Notice: Subject to any disclaimer, the term of this patent is extended or adjusted under 35 U.S.C. 154(b) by 0 days.

(21) Appl. No.: 17/093,271

(22) Filed: Nov. 9, 2020

(65) Prior Publication Data

US 2021/0056916 A1    Feb. 25, 2021

Related U.S. Application Data

(63) Continuation of application No. 15/945,268, filed on Apr. 4, 2018, now Pat. No. 10,832,622.

(60) Provisional application No. 62/481,339, filed on Apr. 4, 2017.

(51) Int. Cl.
  *G09G 3/34* (2006.01)
  *G02F 1/167* (2019.01)
  *G02F 1/1675* (2019.01)
  *G02F 1/1681* (2019.01)

(52) U.S. Cl.
  CPC ............ *G09G 3/344* (2013.01); *G02F 1/167* (2013.01); *G02F 1/1681* (2019.01); *G02F 2001/1678* (2013.01); *G09G 2310/0205* (2013.01); *G09G 2310/0218* (2013.01); *G09G 2310/04* (2013.01); *G09G 2320/0257* (2013.01)

(58) Field of Classification Search
  CPC ............................. G09G 3/344; G09G 3/2018
  USPC ........................................ 345/107, 208, 214
  See application file for complete search history.

(56) References Cited

U.S. PATENT DOCUMENTS

| | | | |
|---|---|---|---|
| 4,418,346 | A | 11/1983 | Batchelder |
| 5,661,533 | A | 8/1997 | Wu et al. |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |

(Continued)

FOREIGN PATENT DOCUMENTS

| | | |
|---|---|---|
| KR | 20130108024 A | 10/2013 |
| WO | 2006079957 A1 | 8/2006 |

OTHER PUBLICATIONS

Wood, D., "An Electrochromic Renaissance?" Information Display, 18(3), 24 (Mar. 2002).

(Continued)

*Primary Examiner* — Calvin C Ma
(74) *Attorney, Agent, or Firm* — Jason P. Colangelo (57) ABSTRACT

A driving method is provided for an electric-optic display having a plurality of display pixels, the method including dividing the plurality of display pixels into multiple groups of pixels, applying at least one waveform structure to the multiple groups of pixels, the at least one waveform structure having a driving section for updating the multiple groups of pixels, and updating the multiple groups of pixels in a contiguous fashion such that only one group of display pixels completes the driving section at any given time.

13 Claims, 4 Drawing Sheets

(56) References Cited

U.S. PATENT DOCUMENTS

| | | |
|---|---|---|
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,885,357 B2 | 4/2005 | Mi |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,615,325 B2 | 11/2009 | Liang et al. |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,688,297 B2 | 3/2010 | Zehner et al. |
| 7,715,088 B2 | 5/2010 | Liang et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,965,274 B2 | 6/2011 | Okada et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,373,649 B2 | 2/2013 | Low et al. |
| 8,384,658 B2 | 2/2013 | Albert et al. |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,593,396 B2 | 11/2013 | Amundson et al. |
| 8,605,032 B2 | 12/2013 | Liu et al. |
| 8,643,595 B2 | 2/2014 | Chung et al. |
| 8,665,206 B2 | 3/2014 | Lin et al. |
| 8,674,931 B2 | 3/2014 | Sun et al. |
| 8,681,191 B2 | 3/2014 | Yang et al. |
| 8,723,889 B2 | 5/2014 | Wang et al. |
| 8,730,153 B2 | 5/2014 | Sprague et al. |
| 8,810,525 B2 | 8/2014 | Sprague |
| 8,928,562 B2 | 1/2015 | Gates et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,171,508 B2 | 10/2015 | Sprague et al. |
| 9,177,511 B2 | 11/2015 | Sato et al. |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,269,311 B2 | 2/2016 | Amundson |
| 9,279,906 B2 | 3/2016 | Kang |
| 9,299,294 B2 | 3/2016 | Lin et al. |
| 9,373,289 B2 | 6/2016 | Sprague et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,417,769 B2 | 8/2016 | Shirota et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,743 B2 | 12/2016 | Sjodin et al. |
| 9,514,667 B2 | 12/2016 | Lin |
| 9,542,895 B2 | 1/2017 | Gates et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,672,766 B2 | 6/2017 | Sjodin |
| 9,691,333 B2 | 6/2017 | Cheng et al. |
| 9,721,495 B2 | 8/2017 | Harrington et al. |

(56) References Cited

U.S. PATENT DOCUMENTS

| | | | |
|---|---|---|---|
| 9,792,861 B2 | 10/2017 | Chang et al. | |
| 9,792,862 B2 | 10/2017 | Hung et al. | |
| 9,966,018 B2 | 5/2018 | Gates et al. | |
| 10,229,641 B2 | 3/2019 | Yang et al. | |
| 10,319,313 B2 | 6/2019 | Harris et al. | |
| 10,339,876 B2 | 7/2019 | Lin et al. | |
| 10,444,553 B2 | 10/2019 | Laxton | |
| 10,672,350 B2 | 6/2020 | Amundson et al. | |
| 2003/0102858 A1 | 6/2003 | Jacobson et al. | |
| 2004/0246562 A1 | 12/2004 | Chung et al. | |
| 2005/0253777 A1 | 11/2005 | Zehner et al. | |
| 2006/0132426 A1 | 6/2006 | Johnson | |
| 2006/0232547 A1 | 10/2006 | Johnson et al. | |
| 2007/0091418 A1 | 4/2007 | Danner et al. | |
| 2007/0103427 A1 | 5/2007 | Zhou et al. | |
| 2007/0176912 A1 | 8/2007 | Beames et al. | |
| 2008/0024429 A1 | 1/2008 | Zehner | |
| 2008/0024482 A1 | 1/2008 | Gates et al. | |
| 2008/0136774 A1 | 6/2008 | Harris et al. | |
| 2008/0303780 A1 | 12/2008 | Sprague et al. | |
| 2009/0174651 A1 | 7/2009 | Jacobson et al. | |
| 2009/0256798 A1* | 10/2009 | Low | G09G 3/344 345/107 |
| 2009/0257005 A1* | 10/2009 | Kamee | G02F 1/133555 349/98 |
| 2009/0322721 A1 | 12/2009 | Zehner et al. | |
| 2010/0194733 A1 | 8/2010 | Lin et al. | |
| 2010/0194789 A1 | 8/2010 | Lin et al. | |
| 2010/0220121 A1 | 9/2010 | Zehner et al. | |
| 2010/0265561 A1 | 10/2010 | Gates et al. | |
| 2011/0063314 A1 | 3/2011 | Chiu et al. | |
| 2011/0175875 A1 | 7/2011 | Lin et al. | |
| 2011/0193840 A1 | 8/2011 | Amundson et al. | |
| 2011/0193841 A1 | 8/2011 | Amundson et al. | |
| 2011/0199671 A1 | 8/2011 | Amundson et al. | |
| 2011/0221732 A1* | 9/2011 | Muto | G09G 3/344 345/211 |
| 2011/0221740 A1 | 9/2011 | Yang et al. | |
| 2012/0001957 A1 | 1/2012 | Liu et al. | |
| 2012/0098740 A1 | 4/2012 | Chiu et al. | |
| 2012/0188272 A1* | 7/2012 | Wang | G09G 3/344 345/629 |
| 2013/0063333 A1 | 3/2013 | Arango et al. | |
| 2013/0194295 A1 | 8/2013 | Chan et al. | |
| 2013/0249782 A1 | 9/2013 | Wu et al. | |
| 2014/0009817 A1 | 1/2014 | Wilcox et al. | |
| 2014/0204012 A1 | 7/2014 | Wu et al. | |
| 2014/0240210 A1 | 8/2014 | Wu et al. | |
| 2014/0240373 A1* | 8/2014 | Harrington | G09G 3/2007 345/690 |
| 2014/0253425 A1 | 9/2014 | Zalesky et al. | |
| 2014/0293398 A1 | 10/2014 | Wang et al. | |
| 2015/0005720 A1 | 1/2015 | Zang | |
| 2015/0084892 A1* | 3/2015 | Shirota | G09G 3/3453 345/173 |
| 2015/0262255 A1 | 9/2015 | Khajehnouri et al. | |
| 2015/0262551 A1 | 9/2015 | Zehner et al. | |
| 2016/0012710 A1 | 1/2016 | Lu et al. | |
| 2016/0133196 A1* | 5/2016 | Emelie | G09G 3/344 345/107 |
| 2016/0140910 A1 | 5/2016 | Amundson | |
| 2016/0180777 A1 | 6/2016 | Lin et al. | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office, PCT/US2018/026052, International Search Report and Written Opinion, dated Jul. 16, 2018.

European Patent Office, EP Appl. No 18780751.6, Extended European Search Report, dated Nov. 13, 2020.

* cited by examiner

Fig. 4

METHODS FOR DRIVING ELECTRO-OPTIC DISPLAYS

REFERENCE TO RELATED APPLICATIONS

This application claims priority to U.S. patent application Ser. No. 15/945,268 filed on Apr. 4, 2018 and claiming priority to U.S. Patent Application No. 62/481,339 filed on Apr. 4, 2017. The entire disclosure of the aforementioned application is herein incorporated by reference.

BACKGROUND OF INVENTION

This invention relates to methods for driving electro-optic displays, especially bistable electro-optic displays. More specifically, this invention relates to driving methods which are intended to reduce undesirable visual effects during transitions from one image to another. This invention is especially, but not exclusively, intended for use with particle-based electrophoretic displays in which one or more types of electrically charged particles are suspended in a liquid and are moved through the liquid under the influence of an electric field to change the appearance of the display.

SUMMARY OF INVENTION

As discussed above, various techniques are known using global limited and other drive schemes to reduce the flashiness of transitions in electro-optic displays. However, in some cases, or in certain products and/or applications, it may be desirable to completely refresh the display at each transitional images to create smooth appeal.

Provided here is a driving method for an electric-optic display having a plurality of display pixels, the method including dividing the plurality of display pixels into multiple groups of pixels, applying at least one waveform structure to the multiple groups of pixels, the at least one waveform structure having a driving section for updating the multiple groups of pixels, and updating the multiple groups of pixels in a contiguous fashion such that only one group of display pixels completes the driving section at any given time.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

The electro-optic displays in which the methods of the present invention are used often contain an electro-optic material which is a solid in the sense that the electro-optic material has solid external surfaces, although the material may, and often does, have internal liquid- or gas-filled space. Such displays using solid electro-optic materials may hereinafter for convenience be referred to as "solid electro-optic displays".

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all. The term "gray level" is used herein to denote the possible optical states of a pixel, including the two extreme optical states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the below mentioned Methods for driving displays applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777;

(i) Applications of displays; see for example U.S. Pat. Nos. 7,312,784 and 8,009,348; and (j) Non-electrophoretic displays, as described in U.S. Pat. No. 6,241,921 and U.S. Patent Application Publication No. 2015/0277160; and applications of encapsulation and microcell technology other than displays; see for example U.S. Pat. No. 7,615,325; and U.S. Patent Applications Publication Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It might at first appear that the ideal method for addressing such an impulse-driven electro-optic display would be so-called "general grayscale image flow" in which a controller arranges each writing of an image so that each pixel transitions directly from its initial gray level to its final gray level. However, inevitably there is some error in writing images on an impulse-driven display. Some such errors encountered in practice include:
  (a) Prior State Dependence; With at least some electro-optic media, the impulse required to switch a pixel to a new optical state depends not only on the current and desired optical state, but also on the previous optical states of the pixel.
  (b) Dwell Time Dependence; With at least some electro-optic media, the impulse required to switch a pixel to a new optical state depends on the time that the pixel has spent in its various optical states. The precise nature of this dependence is not well understood, but in general, more impulse is required the longer the pixel has been in its current optical state.
  (c) Temperature Dependence; The impulse required to switch a pixel to a new optical state depends heavily on temperature.
  (d) Humidity Dependence; The impulse required to switch a pixel to a new optical state depends, with at least some types of electro-optic media, on the ambient humidity.
  (e) Mechanical Uniformity; The impulse required to switch a pixel to a new optical state may be affected by mechanical variations in the display, for example variations in the thickness of an electro-optic medium or an associated lamination adhesive. Other types of mechanical non-uniformity may arise from inevitable variations between different manufacturing batches of medium, manufacturing tolerances and materials variations.
  (f) Voltage Errors; The actual impulse applied to a pixel will inevitably differ slightly from that theoretically applied because of unavoidable slight errors in the voltages delivered by drivers.

General grayscale image flow suffers from an "accumulation of errors" phenomenon. For example, imagine that temperature dependence results in a 0.2 L* (where L* has the usual CIE definition:

$$L^* = 116(R/R_0)^{1/3} - 16,$$

where R is the reflectance and $R_0$ is a standard reflectance value) error in the positive direction on each transition. After fifty transitions, this error will accumulate to 10 L*. Perhaps more realistically, suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images.

This accumulation of errors phenomenon applies not only to errors due to temperature, but also to errors of all the types listed above. As described in the aforementioned U.S. Pat. No. 7,012,600, compensating for such errors is possible, but only to a limited degree of precision. For example, temperature errors can be compensated by using a temperature sensor and a lookup table, but the temperature sensor has a limited resolution and may read a temperature slightly different from that of the electro-optic medium. Similarly, prior state dependence can be compensated by storing the prior states and using a multi-dimensional transition matrix, but controller memory limits the number of states that can be recorded and the size of the transition matrix that can be stored, placing a limit on the precision of this type of compensation.

Thus, general grayscale image flow requires very precise control of applied impulse to give good results, and empirically it has been found that, in the present state of the technology of electro-optic displays, general grayscale image flow is infeasible in a commercial display.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state—see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage is applied during zero transitions (in which the initial and final gray levels are the same). An intermediate form a drive scheme (designated a "global limited" or "GL" drive scheme) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting. However, certain problems remain in this type of GL drive scheme. Firstly, as discussed in detail in some of the aforementioned Methods for driving displays applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an undriven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the undriven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

U.S. application Ser. No. 13/755,111 (Publication No. 2013/0194250) describes various techniques for reducing flashiness in displays, including global limited drive schemes in which only a minor proportion of background pixels are updated during any single transition, so that complete updating of background pixels occurs only after a plurality of transitions.

The present invention relates to reducing or eliminating the problems discussed above while still avoiding so far as possible flashy updates.

Figure 1:
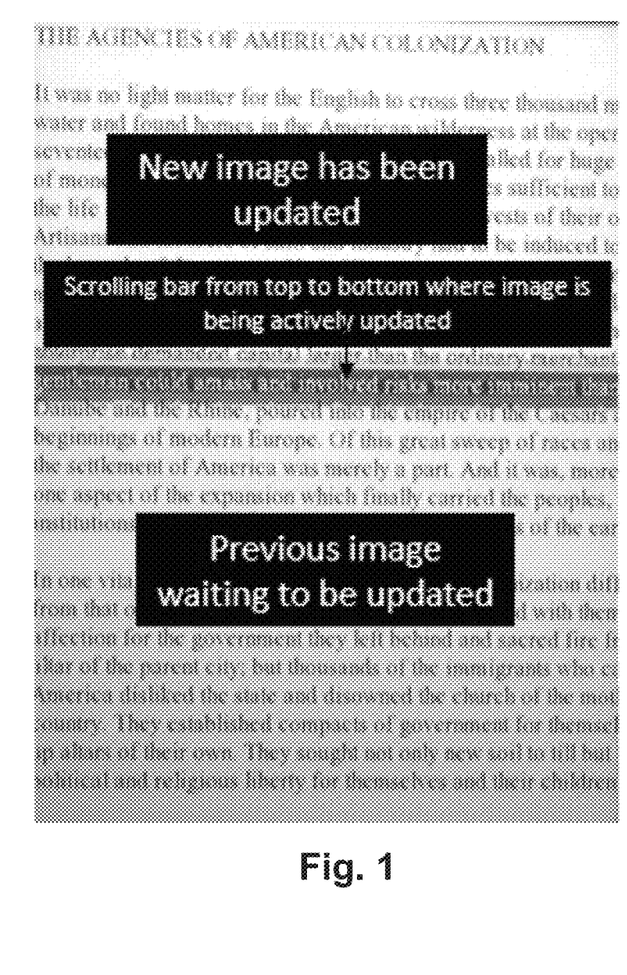
FIG. 1 illustrates an exemplary embodiment of a display screen being updated with a scrolling bar.
Figure 2:
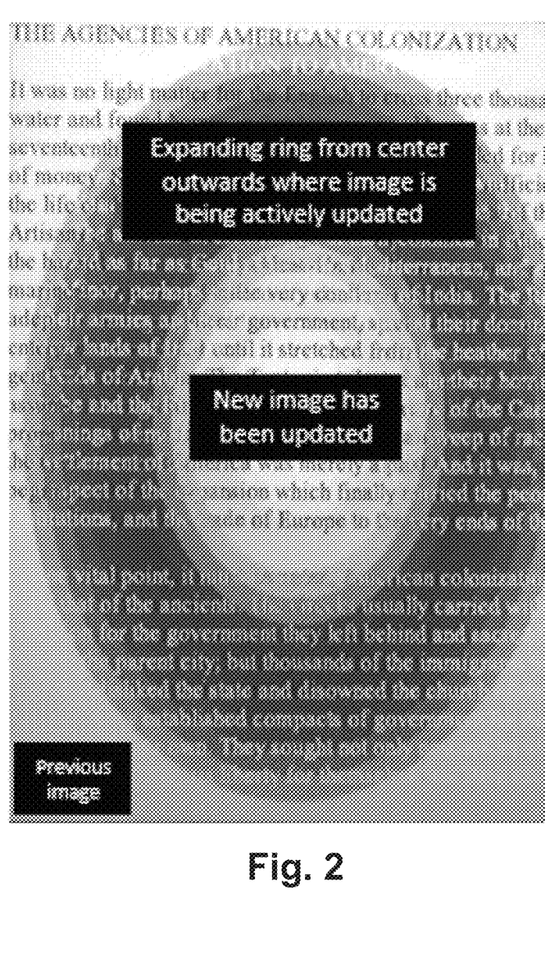
FIG. 2 illustrates an exemplary embodiment of a display screen being updated with an expanding ring.

As already indicated, one aspect of this subject matter disclosed herein relates to methods to perform smooth updates (e.g., a global complete (GC) update) that may be more visually appealing to some users. Smooth GC updates create transition effects that can be tailored as desired within the constraints of the system. In one embodiment, as illustrated in FIG. 1, a new image 100 may replace a previous image 102 with a special transition effect (e.g., scrolling bar 104). In practice, the pixels of the display may be divided into a plurality of non-overlapping groups. The updates for the various groups may be offsetted from one another in time, resulting in a smooth transition with a desired transition effect. For example, a scrolling bar moving vertically or horizontally (FIG. 1 illustrates a vertically moving scroll bar 102), or a "circular update" (in which the various groups of pixels are arranged as annuli so that the transition moves outwardly or inwardly to or from a central area of the display, as illustrated in FIG. 2), or a bar rotating like a clock that uncovers the next image (in which the various groups of pixels are arranged in sectors radiating from a central point). Many other transition effects can be created, but all share the feature that the transition appears smoother and less flashy, as a full refresh of the display is spread out in time and spread across the area of the display such that at a given time, only a small region of the display is being actively updated.

In some embodiments, the location of the groups of pixels should be arranged so that at least one transitory image (e.g. checkerboard, a company logo, a clock, a page number) or an animation-like effect (e.g. dissolve, wipe, scrolling bar, expanding ring from center or spiral) may be displayed during the image update. For example, in FIG. 1, the area of the display may be divided into rectangular regions of a fixed height and width equal to the width of the display. In a variant of the scrolling bar, for example with larger display signs, where the use of a single scroll bar might result in a large bar and/or an unacceptable overall transition time, a display may be divided into rectangular regions each of which is provided with its own scroll bar which only traverses its own rectangular region. For instance, the entire display may be divided into a matrix of rectangular regions, with regions alternating along both axes between vertical and horizontal scroll bars. In some other embodiments, as shown in FIG. 2, a display may be divided into rings where the radius of the larger circle for a given region is equal to the radius of the smaller circle for its neighboring region going outwards from the center. Then, the updates for the various groups are offset in time resulting in a smooth transition with a desired effect. Having a larger number of groups can be beneficial in making the update smoother and also reduce the visibility of the different regions during the update, but this may be limited by the constraints of the system, such as memory or lookup table size. The time offset can be controlled to achieve the desired transition effect as it will impact the speed of the transition. Making the time offset small will make the update faster but the update may also become more flashy if the time offset is too small. Making the time offset high will make the transition long and smooth, but the various regions could become visible making the update too blocky if the number of regions is small. In practice, it may be desirable to co-optimize the number of regions and time offset to achieve the smoothest transition with the desired effect within the constraints of the system. In some embodiments, a region of pixels may consist of one row or column of pixels, wherein other embodiments, a region of pixels may consist of multiple rows or columns of pixels. In one embodiment, the updating of a display may start with one region or group of pixels having multiple rows of pixels and continues one row at a time until all rows of pixels have been updated. In one example, for a display having of having 1600 rows by 1200 columns of display pixels, and with an update time (e.g, time for a driving waveform to fully update a row of pixels) of 250 ms, it would take 400 seconds to update the entire display if the update was done one row at a time. Alternatively, using the scrolling bar as an example, one may design the waveforms and updating structure in a particular fashion such that the multiple rows of pixels may be updated together at a given time, with a time delay built into pixel rows below such that it appears a bar is scrolling across the display and the display is being updated continuously. In this configuration, the rows of pixels are updated in a contiguous fashion, where rows of display pixels are updated continuous and in an orderly fashion.

In some embodiments, the pixels in each group may or may not be contiguous depending on the specific application; for example, the pixels of a display may be randomly assigned to differing groups. This has been found to be especially advantageous when applied to large displays intended as signs in retail stores, malls or outdoor displays, for example menu boards in a restaurant. Such signs may only be updated at long intervals (for example, a menu board might only be updated a few times per day to display differing menus for breakfast, lunch and dinner) and in such circumstances, long update times of the order of 5-60 seconds can be tolerated. Such long update times permit the use of a large number of groups of pixels. For example, a 32 inch (812 mm) active matrix sign having a scan rate of 50 Hz and intended for use as a menu board was updated with pixels randomly assigned to one of 64 groups, with the waveforms for the various groups delayed from one another by 0.12 seconds (six scans) resulting in a total delay of 7.56 seconds between the first and last groups, and a total update time, including edge clearing sections (as discussed below) not exceeding 10 seconds, which is easily tolerable for this type of sign. Since this type of sign is typically placed behind the service counter and above head height so as to be easily readable by a customer approaching the counter, it is typically read at a distance of at least 8 feet (about 2.4 meters) and at this distance the individual pixels are invisible to the reader, who sees only one image fade and be replaced by a new image with essentially no flashiness in the transition, In some other embodiments, any given pixel may not have to remain permanently in the same group. Indeed, to the extent that repeated transitions using the same boundaries between adjacent groups may tend to produce unwanted optical artifacts such as edge effects along such boundaries (because it may not be possible to arrange the necessary correlation of edge clearing sections across such boundaries, as discussed below), it may be advantageous to change the groups after some period and/or a given number of transitions. For example, in the arrangement shown in FIG. 2, one might, after a specified number of transitions move the boundaries between adjacent annuli outwards by one or more pixels, with a new annulus gradually appearing around the center of the display. Alternatively, one could gradually move the center, thereby shifting all the boundaries. It should be noted however, that those skilled in the technology of active matrix electro-optic displays will appreciate that in such displays application of a drive pulse does not occur simultaneously for pixels in all rows because the display is scanned row-by-row so that, for example, there is a delay of almost one frame period between the application of a drive pulse to the first row of a display and application of the same drive pulse to the last row. For ease of explanation, such "intra row delays" are ignored herein, and drive pulses beginning in the same frame period are regarded as applied simultaneously even though in practice they will be applied to different rows at slightly different times.

Figure 3A:
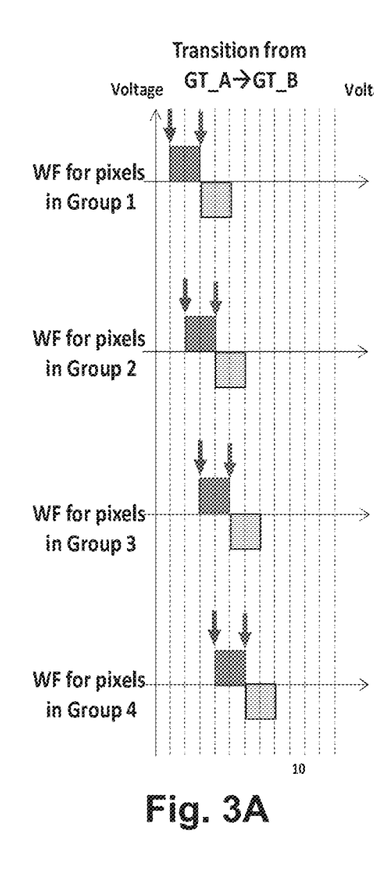
FIGS. 3A-3C are exemplary waveforms that may be adopted to update a display in accordance with the subject matter presented herein.
Figure 3B:
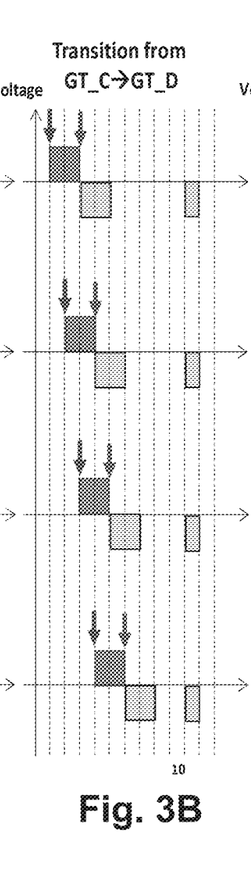
Figure 3C:
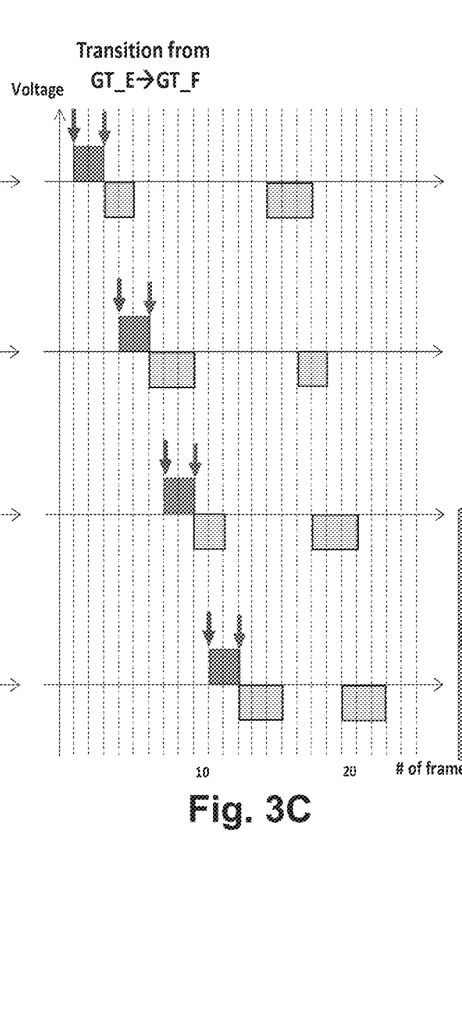

In some embodiments, the waveforms or waveform structure for each group of pixels is not necessarily the same, provided that the color changes of pixels in all the different groups are not effected at the same time. FIGS. 3A-3C illustrates examples of waveforms for different groups for the same optical transitions. In FIG. 3A, the waveform structure is the same with one frame time offset between groups, such that at least two groups of pixels are being updated at a time (i.e., updating waveforms applied onto the pixel). On the other hand, the waveform structures may be different, as illustrated in FIGS. 3B and 3C. For example, waveforms in 3B are dissimilar from each other at least in part due to the difference in the timing of the edge clearing section in reference to the driving section. Where edge clearing section 304 in group 1 waveform is five frames away from the driving section 302, and in comparison the edge clearing 306 and driving 308 sections of group 4 are only 2 frames apart. FIG. 3C further illustrates a waveform structure where the edge clearing sections can have different durations and occurs at a different times in reference to the driving sections. In all these cases presented however, the time at which the electro-optic medium starts to transition from black to white or white to black (marked by red and green arrows in FIGS. 3A-3C) is separated from the corresponding time for all other groups to ensure a smooth transition.

Figure 3D:
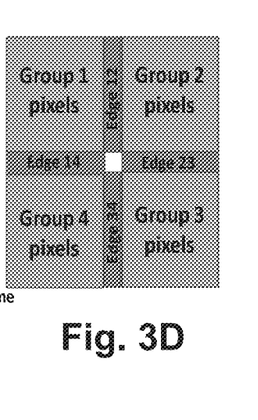
FIG. 3D is a drawing illustrates multiple groups of display pixels and edge effects that may arise from updating these groups in accordance with the subject matter presented herein.

FIGS. 3B-3C also illustrate an important issue regarding waveforms which are designed to deal with edge effects between adjacent pixels. Such waveforms have two sections, namely a driving section (e.g., the sequence of two positive and two negative pulses shown on the left-hand sides of each of FIGS. 3A-3C) and an edge clearing section (e.g., the sequence of one or more negative pulses shown on the right-hand sides of each of FIGS. 3B-3C). To mitigate the edge ghosting issue, it is desirable that the edge clearing section of each waveform have at least one frame in common with the corresponding section of the waveform of at least one other group. For example, the ghosting along Edge 12 illustrated in FIG. 3D can be improved by the overlapping of waveforms for Groups 1 and 2 in at least one frame (e.g., frame 17), as shown in FIG. 3C. In another example shown in FIG. 3C, the clearing of the Edge 14 310 in FIG. 3D is achieved by the overlap between the last frames of the driving section of the Group 4 waveform with the first frame of the edge clearing section of Group 1 in frame 15. In the case of random assignment of pixels to groups, where a pixel of any group may share an edge with a pixel of any other group, it is desirable that all the edge clearing sections have at least one frame in common, as for example illustrated in FIG. 3B, where although the drive sections of all four groups commence at different points in time, all four waveforms share a common single frame edge clearing section. Such a simultaneous application of edge clearing by all groups does, however, tend to produce increased flashiness in the transition, so a compromise may have to be made between thorough edge clearing and flashiness.

As illustrated in FIGS. 3B and 3C, using this updating configuration, only one region or group of pixels receives or completes a driving section of a waveform at any given time, thereby creating a transitional appearance of display updating, where the update process appears smooth to a user. In addition, the edge clearing section of the multiple regions of pixels share at least one frame in time, to clear the unwanted edge effects between the groups of pixels, as described above.

As already described herein, the methods of the present subject matter may be implemented in a number of different ways. In one embodiment, using standard existing architecture, waveforms may be stored in a lookup table of transitions (see the aforementioned Methods for driving displays applications) encoded in such a way that the controller will call, for a given pixel, transition k→n where 'k' is the unique state that corresponds to the current optical state of the pixel, and 'n' is the unique state that corresponds to the next optical state of the pixel as requested by the next input image. Typical images are 8-bit and typical controllers support a lookup table size that is 4-bit or 5-bit, so the desired state from the input image 0-255 is converted by the controller to a desired waveform state 0-15 (for a 4-bit controller) or 0-31 (for a 5-bit controller). Another way to describe this is that input images are 8-bit but typical controllers only support 16 gray levels (for a 4-bit controller) or 32 gray levels (for a 5-bit controller).

Figure 4:
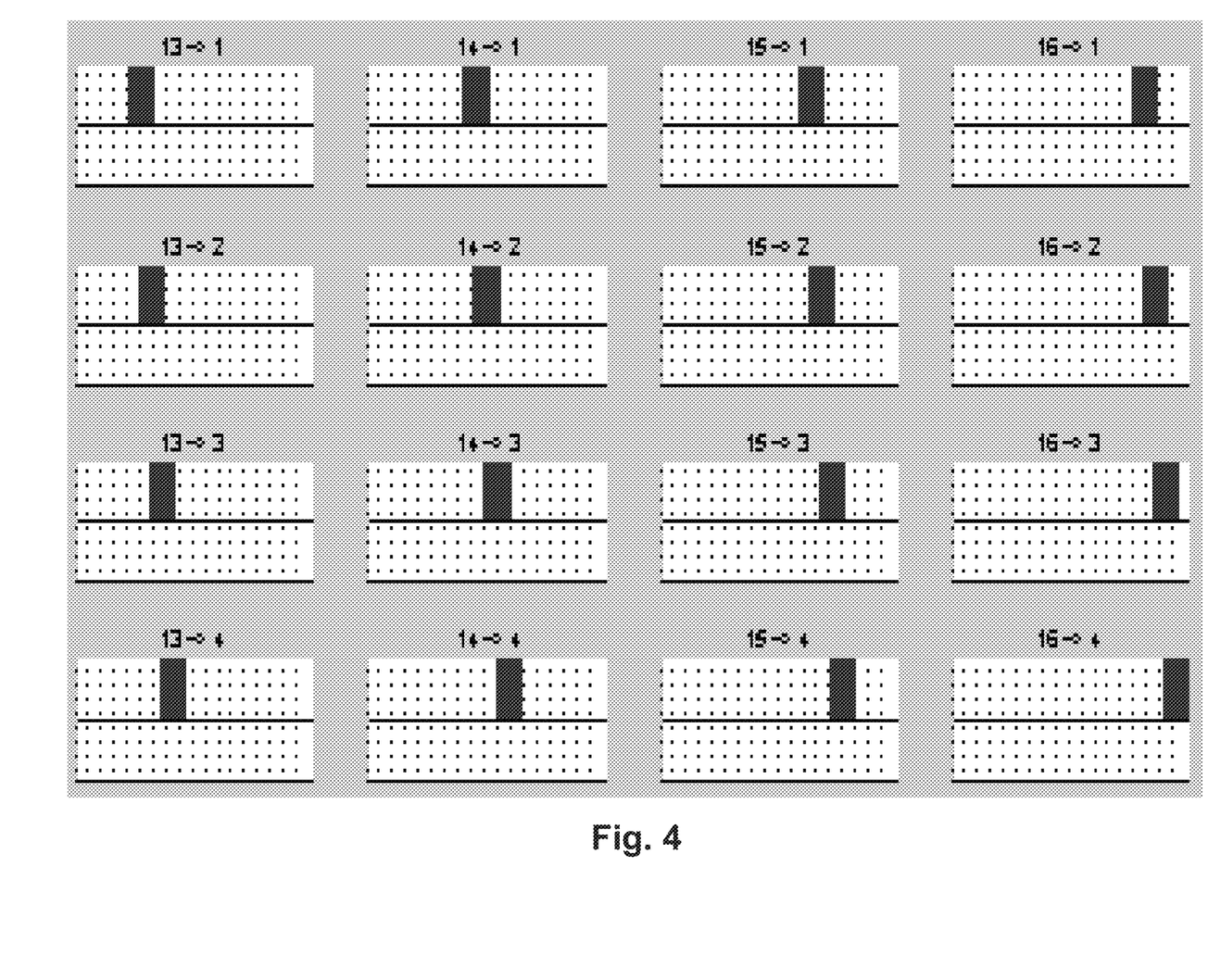
FIG. 4 illustrates an example of waveform encoding showing 16 transitions for a smooth update in accordance with the subject matter presented herein.

In some embodiments, the subject matter presented herein may also be implemented using existing controllers by allocating N waveform transitions for every single possible transition where N is equal to the number of groups of pixels used in the present method. Consider for example implementing the vertically scrolling bar update method of FIG. 1 with a 4-bit controller: if 16 groups of pixels are used, the update can only support four actual gray levels because each actual transition requires storage of 16 different waveforms and 4×4×16=256. The first step is to determine a waveform encoding that allocates to each actual transitions 16 possible transitions with desired time offsets among them. FIG. 4 shows an example of waveform encoding showing the transition White→Black with a minimum time offset of 8 frames. In this case, transitions (13, 14, 15, 16)→(1, 2, 3, 4) have been allocated for the 16 possible waveforms of White→Black. Transition 13→1 corresponds to White-→Black that will appear to be updated first in time (i.e., the waveform for Group 1), while 16→4 is the corresponding waveform that will be updated last (i.e., the waveform for Group 16). In the case of a bar scrolling from top to bottom, pixels experiencing White→Black in the region at the top of the display will receive waveform 13→1 while pixels experiencing White→Black in the region at the bottom of the display will receive waveform 16→4.

Figure 5:
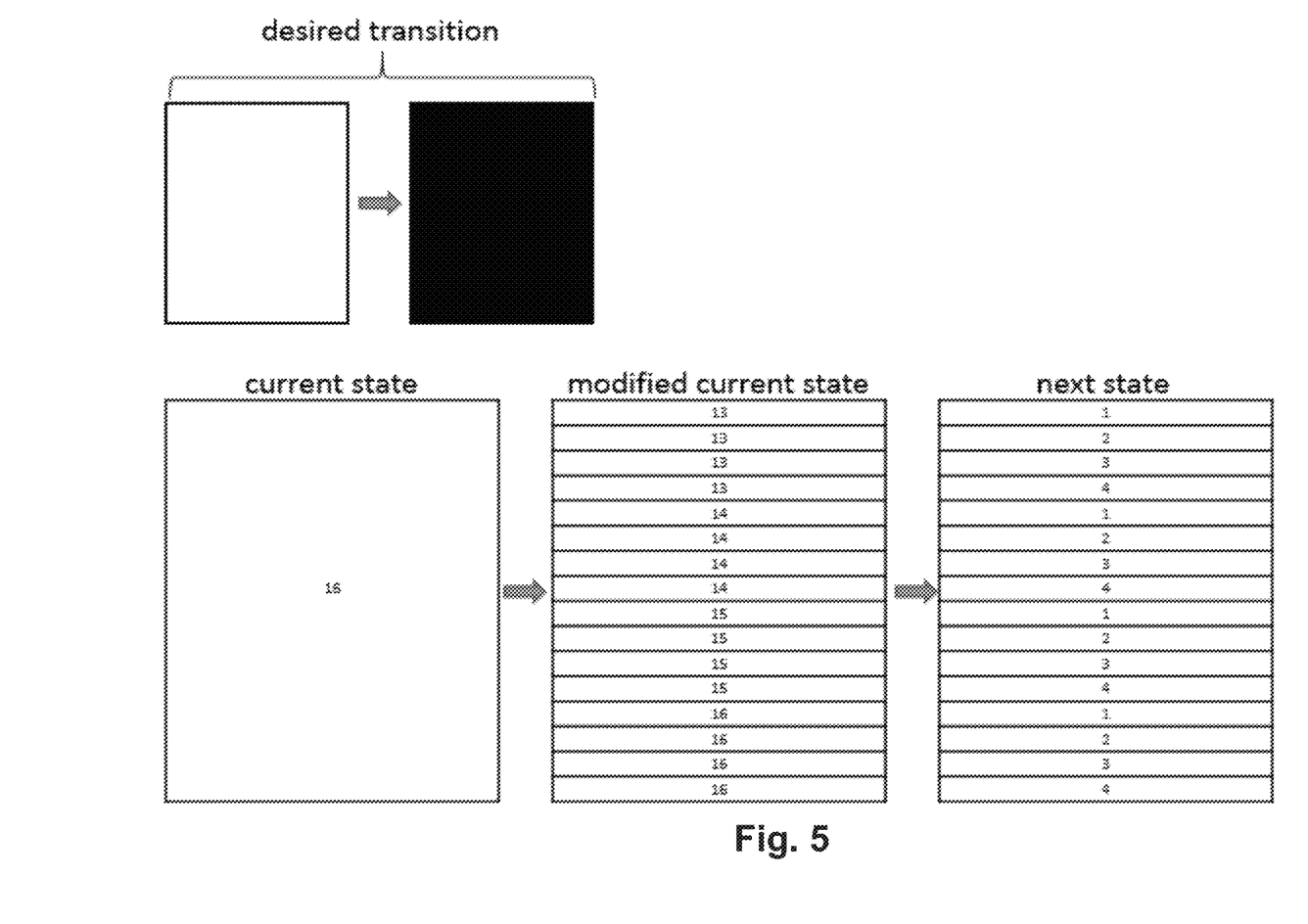
FIG. 5 is an example detailing the steps required to create a white to black transition with a scrolling bar effect from top to bottom using the subject matter presented herein.

FIG. 5 explains in more detail the various steps required to achieve a White→Black transition with a vertically scrolling bar effect from top to bottom using the waveforms shown in FIG. 4. The first step is to modify the current state of each pixel recorded in the controller to match the initial state required by the waveform. In this case, a mask is applied to the image where state 16 is modified to states 13-16 depending on the region in the display. This can be achieved for example by requesting a fake update to the controller using an empty waveform and an image that has been appropriately processed. The purpose of this fake update is to change the current state of the pixels as stored in the controller. The next step is to request a real update with the waveforms shown in FIG. 4, using the next image that has been appropriately processed as shown in FIG. 4 for this particular example. This particular implementation requires requesting a fake update Edge ghosting along the boundaries between the different regions could be a concern in this method, but previous experience suggests that it is not a serious problem in these types of updates, and the time offset between waveforms used in different regions can be carefully designed to minimize edge ghosting.

Controllers may be designed to allow manipulation of the current state of the pixels without requesting an update, thus allowing elimination of the extra fake update as described with reference to FIG. 5 by replacing the fake update with processing of the current state of the pixels as stored by the controller, thus potentially accelerating the implementation of this step. For every pixel, current controllers store current state, next state, and frame count. A controller may store frame offset as an additional field, thus allowing frame and thus time offsets between waveforms for various regions inside the controller. For example, for a vertically scrolling bar update such as that shown in Figure, the frame offset field in the controller would be programmed to achieve the desired scrolling bar transition effect by setting the frame offset to 0 for pixels located in the top region of the display, and the frame offset would increase for pixels at increasing distances from the top edge of the display. The frame count and frame offset would be used by the controller to perform the update. For example, if frame count minus frame offset is negative, no update is performed for that pixel. Otherwise, an update is performed for frame number=frame count−frame offset.

Modifying existing controllers in this manner should be relatively inexpensive as the modification only requires storing one extra field, typically a 4-bit field. Such a modified controller would remove the need for special encoding of the waveforms as described above with reference to FIG. 4 but would permit smooth updates. Also, such a controller modification would remove the compromise required among the waveform lookup table size, number of gray levels rendered and the number of regions (groups of pixels) used. Finally, such a modified controller would potentially enable very smooth updates as the number of regions in the display could be made very large, which would enable greater flexibility in creating interesting smooth transition effects From the foregoing, it will be seen that the present invention can provide smooth full refresh transitions with transition effects that may be more appealing to certain customers compared to a standard full screen global update. The present invention may be especially useful for wearable and mobile device applications.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A electro-optic display having a plurality of display pixels positioned in a plurality of rows and columns, the display comprising:

means to divide the plurality of display pixels into N groups, wherein N is an integer larger than 1; and a controller configured to call, for a display pixel, a transition from a current optical state to a next optical state, wherein the controller allocates N transitions for every single possible transition the display pixel is capable of performing, and to provide a first waveform to a first group of pixels and a second waveform to a second group of pixels, the first waveform and the second waveform each have a driving section and an edge clearing section, wherein the first waveform and the second waveform overlap in time but the driving section of the second waveform lags the driving section of the first waveform by at least one frame.

2. The display of claim 1 wherein the controller is further configured to provide a frame offset, the frame offset being coded to achieve a designed transition effect.

3. The display of claim 2 wherein the frame offset is configured to increase as the designed transition effect progresses on the display.

4. The display of claim 1 wherein the controller is further configured to perform a fake update to change a current state of the plurality of display pixels stored in the controller to accommodate the division of the plurality of display pixels into multiple groups.

5. The display of claim 1, wherein the multiple groups of pixels each have at least one row of display pixels.

6. The display of claim 1, wherein the electric-optic display is an electrophoretic display having a layer of electrophoretic material.

7. The display of claim 6, wherein the electrophoretic material comprising a plurality of electrically charged particles disposed in a fluid and capable of moving through the fluid under the influence of an electric field.

8. The display of claim 7, wherein the electrically charged particles and the fluids are confined within a plurality of capsules or microcells.

9. The display of claim 6, wherein the electrophoretic material comprises a single type of electrophoretic particles in a dyed fluid confined with microcells.

10. The display of claim 6, wherein the electrically charged particles and the fluid are present as a plurality of discrete droplets surrounded by a continuous phase comprising a polymeric material.

11. The display of claim 10, wherein the fluid is gaseous.

12. The display of claim 1 wherein the controller is configured to modify a current state information of the display pixel to better receive a next transition state.

13. The display of claim 1 wherein the controller is configured to store a current state information, a next state information, and frame count information for every display pixel.

* * * * *